United States Patent
Mick et al.

(10) Patent No.: US 9,557,807 B2
(45) Date of Patent: Jan. 31, 2017

(54) USING AUGMENTED REALITY TO CREATE AN INTERFACE FOR DATACENTER AND SYSTEMS MANAGEMENT

(75) Inventors: Jason L. Mick, Converse, TX (US); Joel Wineland, Garden Ridge, TX (US)

(73) Assignee: Rackspace US, Inc., San Antonio, TX (US)

( * ) Notice: Subject to any disclaimer, the term of this patent is extended or adjusted under 35 U.S.C. 154(b) by 584 days.

(21) Appl. No.: 13/190,558

(22) Filed: Jul. 26, 2011

(65) Prior Publication Data

US 2013/0031202 A1    Jan. 31, 2013

(51) Int. Cl.
*G06F 15/16*   (2006.01)
*G06F 3/00*    (2006.01)
*G06Q 10/06*   (2012.01)
*G06Q 10/00*   (2012.01)

(52) U.S. Cl.
CPC ............... *G06F 3/00* (2013.01); *G06Q 10/06* (2013.01); *G06Q 10/20* (2013.01)

(58) Field of Classification Search
CPC .................................................. G06F 11/3055
USPC ......................................................... 709/217
See application file for complete search history.

(56) References Cited

U.S. PATENT DOCUMENTS

| | | | |
|---|---|---|---|
| 2008/0040522 A1* | 2/2008 | Matthews | G06F 3/023 710/107 |
| 2009/0167787 A1* | 7/2009 | Bathiche et al. | 345/633 |
| 2011/0202466 A1* | 8/2011 | Carter | 705/67 |
| 2012/0105202 A1* | 5/2012 | Gits et al. | 340/8.1 |
| 2012/0122570 A1* | 5/2012 | Baronoff | A63F 13/10 463/31 |
| 2012/0200743 A1* | 8/2012 | Blanchflower | H04N 21/254 348/239 |
| 2012/0208564 A1* | 8/2012 | Clark et al. | 455/456.3 |
| 2012/0313963 A1* | 12/2012 | Chen-Quee et al. | 345/593 |

OTHER PUBLICATIONS

Amy-Mae Elliott, mashable.com, "10 Amazing Augmented Reality iPhone Apps," Dec. 2, 2009, 15 pages.
Raju PP, techpp.com, "15 Stunning Augmented Reality Apps for iPhone," Oct. 21, 2009, 18 pages.

* cited by examiner

*Primary Examiner* — Wing F Chan
*Assistant Examiner* — Andrew Woo
(74) *Attorney, Agent, or Firm* — Trop, Pruner & Hu, P.C.

(57) ABSTRACT

In one embodiment, a method includes obtaining information to determine a location of a data center device, communicating the information and an identity of a user of a portable device to an augmented reality manager, and receiving in the portable device overlay information responsive to the communication and a type of the user. This information can then be displayed over a view of the data center device on a display of the portable device.

11 Claims, 3 Drawing Sheets

USING AUGMENTED REALITY TO CREATE AN INTERFACE FOR DATACENTER AND SYSTEMS MANAGEMENT

BACKGROUND

In modern industrial operations such as factories and computing environments such as data centers, a large amount of automation can occur, e.g., by robotic machines that perform operations on a factory floor, or servers that that perform computing in a data center environment. Human operators who interact with these automated systems can typically access only a limited amount of information regarding operation of these systems when present in the location of the equipment. For example, a rack of servers may include stickers to identify servers or various indicators, e.g., visible lights, to identify an operating server, networking and other devices. More commonly, greater amounts of information regarding the systems can be available remotely. For example, in the data center context, a data center employee such as a systems administrator or technician can access a server via a remote desktop and a remote control card present in the server. Although such remote control access can be suitable for many tasks, it is of no value to the user when at the location of the server.

Furthermore, in many data centers, employees who walk the data center may be unaware of any issues that may be present in the data center equipment, as generally there are no resources on the data center floor, other than failure lights or audible beeps. In the absence of such audible or visual alerts, the user is unaware of whether a device is working or not. Further, when a user does become aware of a failure in a server, e.g., due to a remote notification, it is difficult for the user to determine the actual location of the failing server, which can be present in a rack with many other rack-based servers. Thus although the typical data center employee can use existing management infrastructure to monitor devices, this monitoring is not readily available when a user is present on the data center floor.

SUMMARY OF THE INVENTION

According to one aspect, the present invention relates to using augmented reality information to aid users in a variety of fields such as within data centers, industrial facilities, maintenance operations and so forth. As one example, a method includes receiving an image of a piece of data center equipment via an image capture device of a portable device, and sending a query to an augmented reality manager. The query can include the image and an identity of a user and location information regarding a location of the portable device in proximity to the equipment. Then overlay information can be received responsive to this query. This information can be displayed over a view of the equipment on a display of the portable device. In this way, a user can obtain timely status information to aid in various operations such as performing maintenance actions on a component of the equipment.

Another aspect of the present invention is directed to a system that includes an augmented reality manager to provide an interface between remote users and an infrastructure system that maintains information regarding controllable systems. Coupled to this manager can be a storage device that stores an augmented reality application to enable a user to remotely access the manager, e.g., via a mobile device, and to communicate identification information to the manager. From this information, overlay information for the controllable system can be received and used as desired by the user.

The infrastructure system can include different servers or other systems that can store and access the information about the systems. In turn, the manager can access selected information of the controllable system from the infrastructure system responsive to identification information received from the mobile device and send at least some of the information to the mobile device. This information may be presented on a display of the mobile device as an overlay to an image of the controllable system. In some implementations, different types of information can be provided depending on a user type.

Yet another aspect is directed to operations to enable a portable device to obtain information to determine a location of a data center device, communicate the information and an identity of a user to an augmented reality manager, receive overlay information responsive to the communication and a type of the user, and display the information over a view of the data center device on a display of the portable device. From this information, a user can use the portable device to remotely access the data center device to perform an action on the data center device.

DETAILED DESCRIPTION

In various embodiments, an augmented reality system can be used to aid a user in various operations for managing equipment. More specifically, embodiments described herein are with regard to equipment present in a data center, such as a multi-tenant data center. The data center can include various server systems such as rack-based server systems, some of which can be dedicated to a particular client, and some of which can be shared among clients, e.g., according to a cloud computing model. In addition to servers, the data center may include various storages such as storage attached networks, switching equipment, firewalls, load balancers and many other types of equipment. Although embodiments described herein are for a data center implementation, understand the scope of the present invention is not limited in this regard and other embodiments can be used in various locations, such as industrial control, HVAC, maintenance, facilities, security, and so forth.

A user can access various information regarding data center equipment while located in close proximity to the equipment. For example, a data center worker present at a rack system (e.g., a rack of servers) can obtain useful information regarding equipment in the rack. More specifically, an overlay of information regarding components of the rack can be obtained from an augmented reality system that is configured to access various information regarding the equipment in the rack and provide at least some of the information to the user. And, this information may be tailored to the specific user. In this way, customized information can be provided to different types of users depending on their desire (and/or authorization) to receive information specialized for their own particular use.

Figure 1:
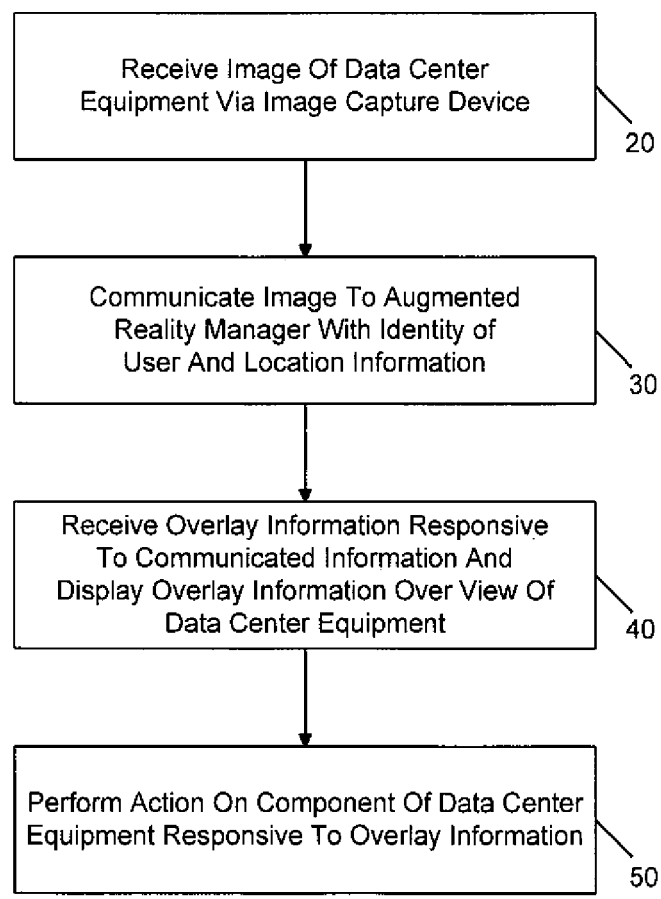
FIG. 1 is a flow diagram of a high-level method of using augmented reality tools to provide information in accordance with one embodiment of the present invention.

Referring now to FIG. 1, shown is a flow diagram of a high-level method of using augmented reality tools to provide relevant information to a user in accordance with an embodiment of the present invention. In many embodiments, the method of FIG. 1 may be performed by a user application stored on a portable device. The environment of FIG. 1 is in the data center context for purposes of illustration, and it is assumed that the user is a technical user; however this may not be the case. For example, in other situations a financial analyst or other financial personnel of the data center can use the same augmented reality system to obtain different information tailored to his or her needs. In still other examples, a maintenance worker of the data center facility may be able to obtain limited information, e.g., regarding power and temperature of the data center equipment, relevant to the maintenance worker. And of course, embodiments are applicable in many environments besides a data center context.

As seen in FIG. 1, method 10 may begin by receiving an image of a piece of data center equipment via an image capture device (block 20). For example, a user can visualize a rack or other equipment, e.g., via a smart phone, tablet computer or other portable computing device that has a display and a capture device. For the example used herein, assume that the piece of data center equipment is a rack including multiple servers, storage units, power supplies, networking equipment and so forth. In some embodiments, the rack can have a machine-readable identifier associated with it, e.g., a barcode, matrix code such as a so-called quick response code or other machine-readable identifier, either optical, radio frequency based or otherwise. In some implementations, rather than imaging the entire rack, only this machine-readable identifier can be imaged.

Still referring to FIG. 1, next the image may be communicated to an augmented reality manager (block 30). In addition, an identity of the user may be communicated to the augmented reality manager. As one example, the user identity may be an identification of a type of user, rather than an identification of a particular individual. For example, the augmented reality application on the user's device can be configured to request an identification of a type of the user, such as a technical person, maintenance person, financial person or so forth. By providing this information, targeted information for use by the type of individual can be accessed and sent to the user. Still further, geographic information may further be provided in the communication in embodiments such as where an image does not include a machine-readable identifier that enables identification of the particular equipment (where the machine-readable identifier acts as a geographic identifier). For example, a smart phone or other computing device may include a GPS sensor that can provide relatively accurate geographic location information. Or a location can be determined by using triangulation information, e.g., accessed from multiple wireless access points in proximity to the smart phone. In some embodiments, the user application can obtain a location, e.g., via a built-in compass, GPS sensor or so forth. The collected information, e.g., image, geographic information and user information can then be communicated to the augmented reality manager as a query to pass to backend infrastructure to obtain the information about the components in the visual proximity of the computing device, and populate information on the computing device's display with data obtained from the backend infrastructure. Note that the communication may also include, or be preceded by, a login/authentication protocol to ensure that the user is authorized to access the augmented reality manager.

In some embodiments, the augmented reality manager may be a server computer that provides for interaction between end users, e.g., by way of an application installed on a user's smart phone, tablet computer or other computing device (and which can be downloaded from a server of the augmented reality manager or other entity having the application stored in an application database), and various backend or systems management infrastructure systems of the data center from which information can be obtained. Responsive to receipt of this communication including the image and user identity, specific information regarding equipment present in the rack or other enclosure can be communicated and displayed directly on the smart phone or tablet, overlaid to an image of the equipment itself (block 40). The overlay information that is communicated back to the smart phone or tablet can be targeted to the particular user. For example, for a technical user, e.g., seeking to repair a fault somewhere in the rack, the overlay information may provide status information accessed from another system of the data center to thus identify to the user the actual component within the rack that is to be repaired or otherwise managed.

The type of information that can be provided as an overlay is unlimited. For example, with regard to technical personnel, the information can be of many different types, including status of a given server, IP address, power and/or temperature information, utilization information, among many other different types of information. Further information, such as an identification of cabling or other connections between a given server and other equipment in the rack, can also be provided by overlay. Instead, for inventory control personnel, serial numbers or other identifiers can be provided for given servers or other equipment within the rack, to enable the inventory control personnel to compare this information to information present on the equipment itself or other records. For a financial user, instead the information may be directed to revenue per server, revenue per rack, number of clients assigned to units within the rack or other such information of a financial nature.

In the particular embodiment described here, however, the user is a technical user and the overlay information relates to technical information regarding the equipment within the rack. Assume for purposes of discussion that the information includes a status of the various components, where the status information may identify whether the unit is operating properly or is suffering from a failure of some sort. In addition to identification of the particular device that has failed, information regarding the type of failure can also be provided.

Still referring to FIG. 1, method 10 may further continue by performing an action on a component of the equipment in the rack responsive to the overlay information (block 50). That is, in a maintenance situation, and depending on the type of failure, a user may take remote control actions using the smart phone, tablet or other computing device. For example, assume that the failure is due to an unrecoverable error. To remedy the failure, the user can be provided with a menu of options such as an option to reboot the machine, or to perform a hard reset or another type of control operation on the piece of equipment. Also, via a remote control feature that can be implemented through the augmented reality manager or a separate remote control system, a user can remote into the server to perform various diagnostics or other testing to identify a source of a problem via the smart phone or other computing device. Of course many other operations can be performed on the equipment based on the overlay information provided by an augmented reality manager in accordance with an embodiment of the present invention.

In some embodiments, the overlay information can be overlaid over a stored image of the rack that is communicated back to the user's smart phone or other device with the overlay information. Or simply the overlay information can be communicated back to the smart phone, where it is overlaid on appropriate portions of the user's display at which the corresponding pieces of equipment are located, using a live image of the rack obtained from the image capture device of the smart phone or other computing device. And further in such embodiments, the overlay information can be dynamically displayed to correspond to the view of the equipment present on the display of the computing device. That is, as a user scans a rack, e.g., from top to bottom, status information corresponding to different servers in the rack, from top to bottom can be dynamically overlaid over the changing view on the display.

Figure 2:
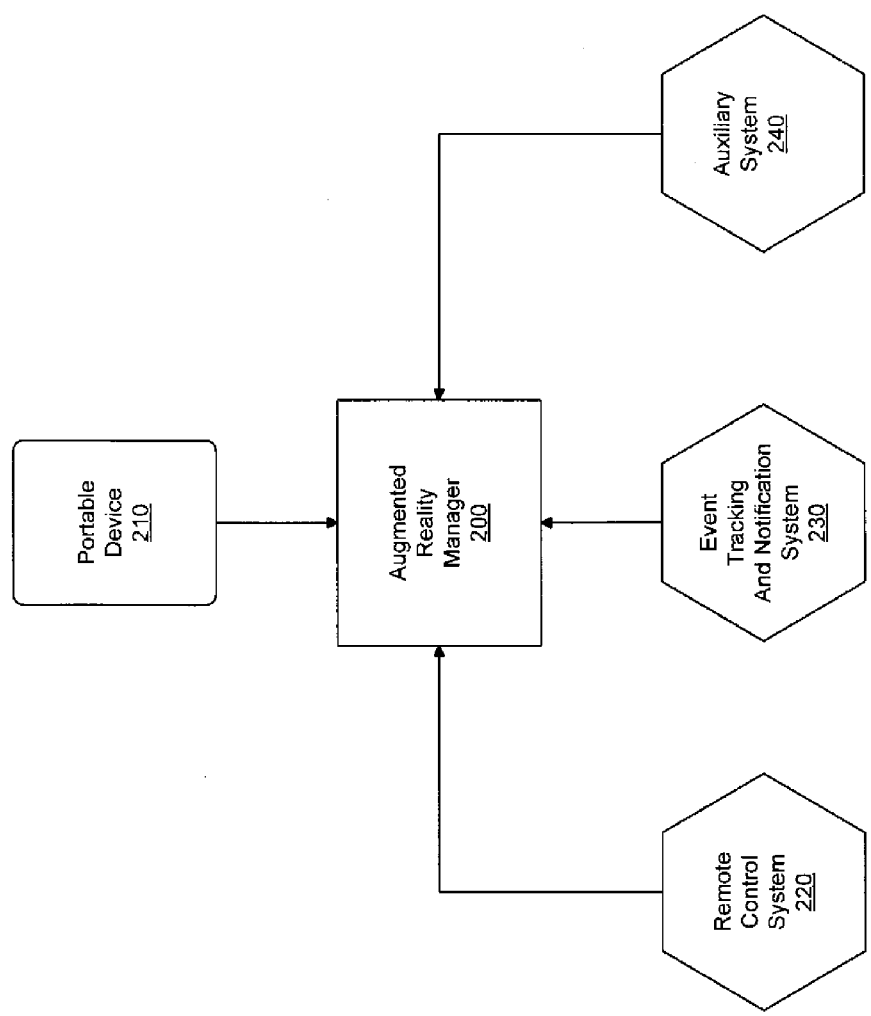
FIG. 2 is a block diagram illustrating the interaction between various components of a system in accordance with an embodiment of the present invention.

Referring now to FIG. 2, shown is a block diagram illustrating the interaction between various components of a system in accordance with an embodiment of the present invention. As shown in FIG. 2, an augmented reality manager 200 may be in communication with various systems and devices to allow interaction between a user at a particular location and these systems to enable the identification of the user's location and provide to the user appropriate information that is focused or targeted to the particular type of user. As seen, augmented reality manager 200 may be in communication with a portable device 210. As discussed above, portable device 210 may be accessible to a user and can be a smart phone, tablet computer or other mobile computing device. In some embodiments, this computing device can be configured with an application or other utility to enable interaction with an augmented reality system as described herein. Such application can be downloaded, e.g., from a storage of the augmented reality system by an authorized user to enable the user to access information while present at a particular location.

As further seen in FIG. 2, augmented reality manager 200 may further be coupled to other systems, including a remote control system 220. In various embodiments, remote control system 220, which can be implemented in one or more servers of a data center, can be used to provide tools to enable a user to perform remote control operations to control components (or access to such components) within a given rack or other data center equipment. For example, remote control, diagnostics and/or system debugging tools can be accessed by a user via augmented reality manager 200.

Still referring to FIG. 2, additional systems can be provided for interacting with augmented reality manager 200. For example, an event tracking and notification system 230 may communicate with the augmented reality manager. In this way, status information, failure notifications, and so forth can be communicated to a user via the augmented reality manager. Based on an identification of a given rack at which the user is located, a set of most recent events occurring on components within the rack or failures of components within the rack, along with other information tracked by an event tracking and notification system can be communicated to the user. In addition to this technical system, other technical systems may also be in communication with the augmented reality manager.

Still further with regard to FIG. 2, augmented reality manager 200 may communicate with yet other systems such as an auxiliary system 240, e.g., including an accounting system, an inventory system, a HVAC system, a security system or others. Understand that the various systems shown in FIG. 2 may be of a single entity, such as a multi-tenant data center. And the systems can be accessible via a local network such as a wired or wireless local area network, or even remotely via the Internet. However, in other embodiments the systems can be of different entities. For example, a maintenance worker, e.g., a utility worker or HVAC service worker, can access an augmented reality manager to obtain information regarding equipment of a customer. Although shown with this particular implementation in the embodiment of FIG. 2 understand the scope of the present invention is not limited in this regard.

For example, another implementation may be in connection with security systems to determine an identity and timing of individuals who have accessed a secure location. For example, an application can be provided to security personnel for use on a portable device to enable an identification of individuals that have accessed a secure location, e.g., behind a door having a controlled access point such as a badge reader. By imaging the badge reader or other controlled access point, e.g., having the barcode or other machine-readable identifier to thus obtain a location of this controlled access point, security personnel can access an augmented reality manager to query a backend system such as a security system to identify the individuals who have gained access to the secure location.

Figure 3:
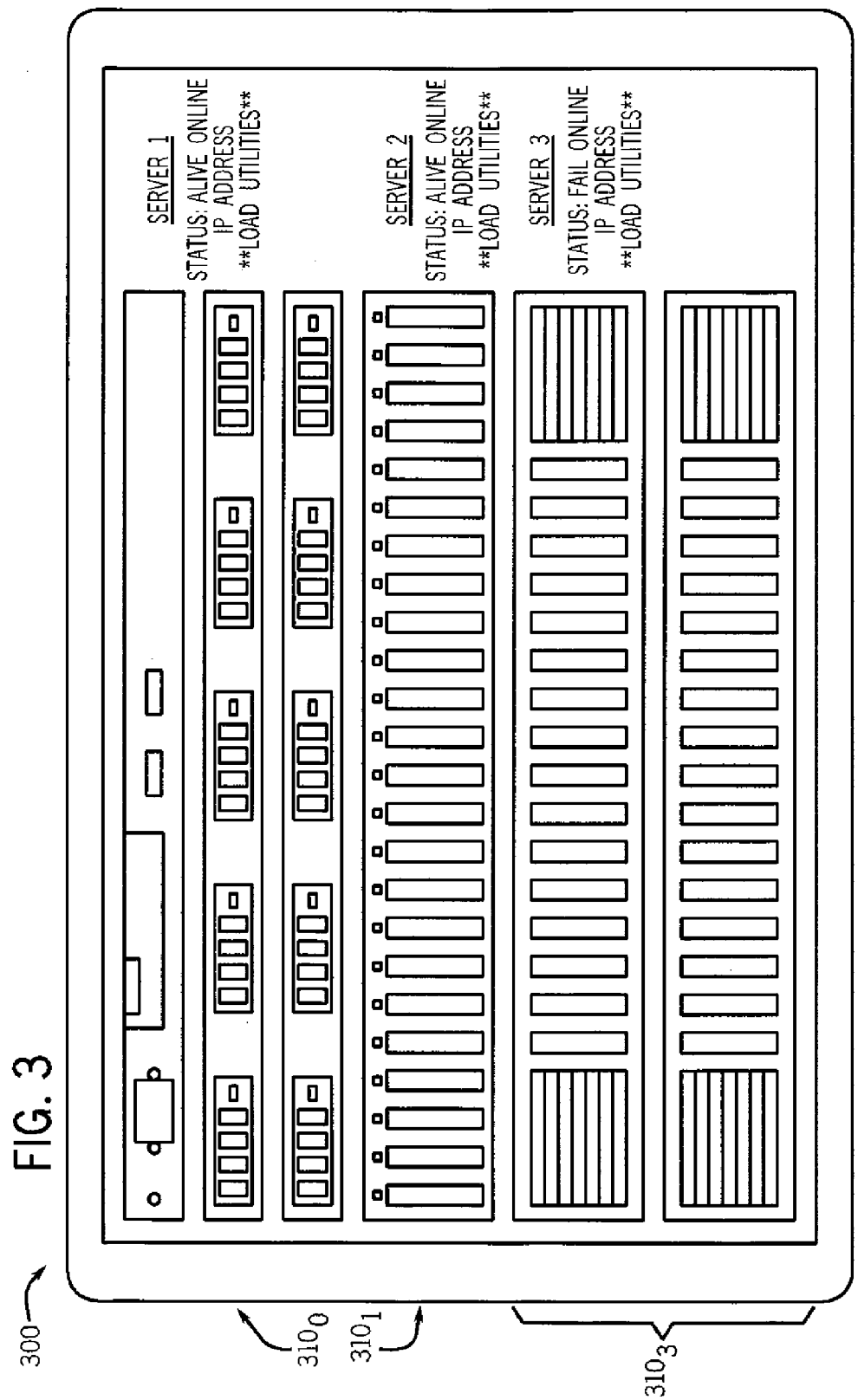
FIG. 3 is an illustration of an image of a rack and overlay information that is available in accordance with an embodiment of the present invention.

Referring now to FIG. 3, shown is an illustration of an image of a rack and overlay information that is available in accordance with an embodiment of the present invention. As shown in FIG. 3, a plurality of rack-mounted servers $310_0$-$310_3$ may be configured within a rack 300. In the embodiment of FIG. 3, server $310_0$ may be a single server node, server $310_1$ may be a multi-node server (e.g., a 4 node server in 1-2U chassis), and server $310_3$ may be another multi-node server (e.g., a 2 node chassis (2 servers in a 2U chassis)). Still further, additional components may also be present. As seen in the illustration of FIG. 3, identification information and status information, along with certain configuration information, e.g., an IP address, can be provided for each piece of equipment. In yet other embodiments, additional information can be accessed. In other instances, the status information can include information obtained from various sensing probes present in the rack. For example, a rack can include various ambient and exhaust temperature probes to thus obtain information regarding temperature at different locations of the rack, and this information can be provided by overlay as well. A user may determine what information to be displayed, and for what devices such that the overlay information may be for a single server or a single node in a multi-node or blade system. Furthermore, a user may select various menu options that provide for access to further information regarding the equipment present within the rack. Although shown at this high level in the illustration of FIG. 3, understand that in various implementations, a great deal of information can be obtained and provided to a user via an overlay mechanism in accordance with an embodiment of the present invention. Furthermore, understand that although embodiments may utilize an overlay mechanism to provide visualization of the equipment itself along with its corresponding information, in other embodiments information provided via an augmented reality manager can be displayed without the corresponding image of the equipment.

Embodiments thus allow a system administrator, data center operations engineer, or any other data center personnel to have a view of their systems through their mobile device with an overlay of specific device details. The camera in the mobile device is used and the application overlays details and provides links to control infrastructure. Using augmented reality a data center employee can easily use their mobile device to get technical details about devices that are in a rack. By using the camera on a smart phone to identify the devices, identification, event monitoring, and system control becomes completely natural.

Embodiments may be implemented in code and may be stored on a storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an image of a piece of data center equipment of a multi-tenant data center via an image capture device of a portable device of a user while the user is located in proximity to the data center equipment piece;
   sending a query to an augmented reality manager of the multi-tenant data center, the query including the image, an identity of the user and location information regarding a location of the portable device in proximity to the data center equipment piece;
   receiving overlay information responsive to the query from the augmented reality manager and dynamically displaying the overlay information to correspond to a view of the piece of data center equipment on a display of the portable device, the overlay information targeted to the user based on the user identity; and
   communicating between the portable device and a remote control system of the multi-tenant data center coupled to the augmented reality manager via the augmented reality manager to cause at least one of a remote control operation, a diagnostics operation and a debugging operation using one or more tools of the remote control system to perform maintenance on at least one component of the data center equipment piece, the data center equipment piece corresponding to a server rack, wherein the overlay information includes status information obtained from one or more sensors of the server rack and further identifies a failure status of the at least one component, the failure status obtained from an event monitoring system of the multi-tenant data center coupled to the augmented reality manager, and wherein the overlay information is of different types of information according to a type of user based on the user identity.

2. The method of claim 1, further comprising performing an action on a component of the piece of data center equipment based on the overlay information.

3. The method of claim 1, wherein the overlay information includes maintenance information when the user is a technical user.

4. The method of claim 3, wherein the overlay information includes financial information when the user is a financial user.

5. The method of claim 1, wherein the failure status of the at least one component enables the user to identify a failed component within the server rack.

6. The method of claim 1, wherein the location information comprises a machine-readable identifier of the data center equipment piece within the image.

7. A system comprising:
   an augmented reality manager to provide an interface between remote users and an infrastructure system that maintains information regarding a plurality of controllable systems;
   a storage device including an augmented reality application to enable a user to remotely access the augmented reality manager via a mobile device and to communicate identification information to the augmented reality manager including a type of the user and a location of a controllable system of the plurality of controllable systems in proximity to the mobile device, and to receive overlay information for the controllable system, and responsive to the overlay information to enable a communication between the mobile device and a remote control system to cause a remote control operation to be performed on at least one component of the controllable system, the controllable system corresponding to a server rack, wherein the overlay information identifies a failure status of the at least one component, the augmented reality application to be downloaded to the mobile phone responsive to authentication of the user; and
   the infrastructure system including at least one storage to store the information regarding the plurality of controllable systems, wherein the augmented reality manager is to access selected information of the controllable system from the infrastructure system responsive to the identification information received from the mobile device and targeted to the user type, and to send at least a portion of the selected information to the mobile device to enable the selected information portion to be presented on a display of the mobile device to overlay on an image of the controllable system, wherein the augmented reality manager is to provide different levels of selected information to different users based on the user type, including to provide a first type of selected information to a first type of user and a second type of selected information to a second type of user, and wherein the first type of selected information includes maintenance information when the user is a technical user and the second type of selected information includes financial information when the user is a financial user, the infrastructure system comprising an event monitoring system of a data center and the remote control system of the data center, wherein the infrastructure system is to receive a machine readable identifier from the augmented reality manager corresponding to the controllable system and to provide the first type of selected information when the user is the first type of user, and to provide the second type of selected information when the user is of the second type of user.

8. The system of claim 7, wherein the controllable system comprises an access control mechanism that protects a secure location.

9. The system of claim 7, wherein the augmented reality application is to enable a dynamic display of the selected information portion as a user moves an image capture device of the mobile device to view a different portion of the controllable system.

10. An article comprising a non-transitory machine-accessible storage medium including instructions that when executed cause a portable device to:
- obtain information to determine a location of a data center device of a data center;
- communicate the information and an identity of a user to an augmented reality manager of the data center;
- receive, from the augmented reality manager, overlay information responsive to the communication and a type of the user and display the overlay information over a view of the data center device on a display of the portable device, the overlay information obtained from an event monitoring system of the data center coupled to the augmented reality manager and targeted to the user based on the identity of the user, including to present technical overlay information when the user type indicates a technical type, the technical overlay information obtained from at least one technical system of the data center and including failure information for the data center device; and
- remotely access the data center device via a remote control system of the data center coupled to the augmented reality manager by communication from the portable device to the remote control system via the augmented reality manager, to enable one or more tools of the remote control system to perform a maintenance action on the data center device.

11. The article of claim 10, further comprising instructions that when executed enable the portable device to obtain the information as an image of the data center device using an image capture device of the portable device, the image including a machine-readable identifier.

* * * * *